United States Patent [19]
Singer

[11] Patent Number: 5,943,607
[45] Date of Patent: Aug. 24, 1999

[54] AUTOMATICALLY NOTIFYING MESSAGING DEVICE USERS OF SELECTED INCOMING CALLS TO A TELEPHONE SET

[75] Inventor: Howard M. Singer, Marlboro, N.J.

[73] Assignee: Lucent Technologies Inc., Murray Hill, N.J.

[21] Appl. No.: 08/732,960

[22] Filed: Oct. 17, 1996

[51] Int. Cl.[6] ............................. H04M 1/64; H04Q 7/06
[52] U.S. Cl. ................................ 455/31.3; 379/88.15
[58] Field of Search .................. 455/31.2, 31.3, 455/413, 417; 379/88.12, 88.15, 211

[56] References Cited

U.S. PATENT DOCUMENTS 5,428,663  6/1995  Grimes et al. ..................... 455/31.2
5,432,839  7/1995  DeLuca .............................. 455/31.2

OTHER PUBLICATIONS

"How to Start and build a Law Practice," by Jay G. Foonberg, pp. 75–76, 1991.

*Primary Examiner*—Andrew M. Dollnar

[57] ABSTRACT

A telephone set automatically transmits a paging message to notify a user that a call from a selected caller has been received. In one embodiment, the telephone set transmits the paging message to a service bureau which formats and relays the paging message to the user's messaging device.

20 Claims, 2 Drawing Sheets

AUTOMATICALLY NOTIFYING MESSAGING DEVICE USERS OF SELECTED INCOMING CALLS TO A TELEPHONE SET

BACKGROUND OF THE INVENTION

1. Field of the Invention

The present invention relates to communications, and, in particular, to telephone sets, service bureaus, and messaging devices.

2. Description of the Related Art

There are many situations in which someone is interested in receiving a telephone call from a particular person, but may be unable to wait around by the phone until that particular person calls. For example, a parent may be anxious to know that his or her child has safely arrived at the child's destination, e.g., returning to a college dormitory from a holiday visit at home. Nevertheless, the parent may be unable to wait around by the telephone for the child to call.

The present invention provides a mechanism for timely notifying a user (e.g., the parent in the above example) of the receipt of a telephone call from a selected caller (e.g., the child) without having to wait by the phone for the call.

Some private branch exchange (PBX)-based voice-mail systems and network-based systems provide the option of sending a paging message when a call is received, but these systems do not provide selective automatic paging. That is, they do not permit a user to select particular callers, such that incoming calls from only those selected callers will automatically cause a paging message to be sent. Moreover, they do not allow the user to change those selections at the user's discretion. The PBX-based systems are all or nothing: the user has the option of selecting either (1) that all incoming calls will generate paging messages or (2) that none will.

In the network-based systems, a caller will be able to page the user only if the caller has been given the user's access code. In this case, however, paging messages are not automatically generated; the caller must manually select the option to send a paging message. Moreover, the user cannot turn off and on, at the user's discretion, the ability of selected callers to send paging messages. If a particular caller knows the user's access code, that caller will always be able to send a paging message.

The present invention provides advantages over these prior art systems by supporting selective automatic paging.

Further objects and advantages of this invention will become apparent from the detailed description which follows.

SUMMARY OF THE INVENTION

The present invention is directed to the processing of telephone calls. According to one embodiment, a network interface receives an incoming call over a communications network and a processor transmits a paging message, if the incoming call corresponds to a selected caller.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The present invention is directed to an apparatus, such as a telephone set, that automatically transmits a paging message to notify a user that a call from a selected caller has been received. In one embodiment, the telephone set transmits the paging message to a service bureau which formats and relays the paging message to the user's messaging device.

Figure 1:
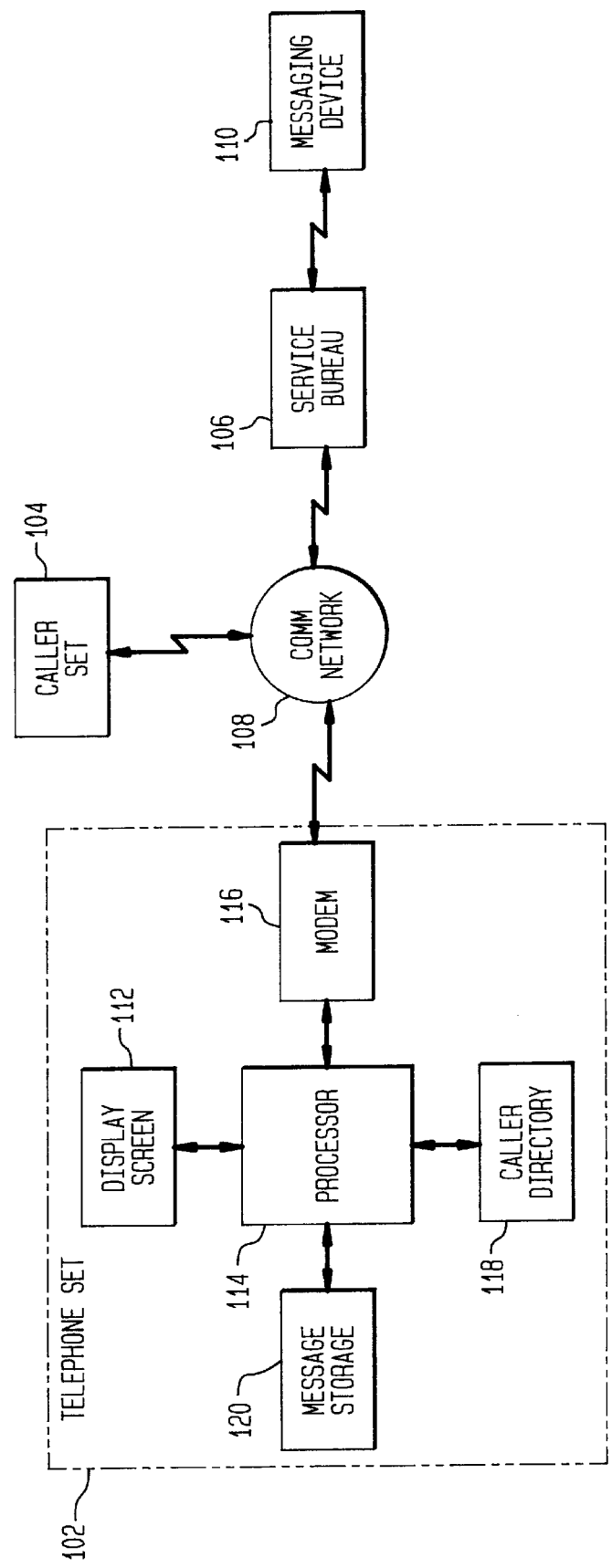
FIG. 1 is a block diagram of a communications system, according to one embodiment of the present invention.

Referring now to FIG. 1, there is shown a block diagram of a communications system, according to one embodiment of the present invention. The communications system of FIG. 1 comprises telephone set 102, caller set 104, and service bureau 106, which are all interconnected over communications network 108, and messaging device 110. Telephone set 102 comprises display screen 112, processor 114, modem 116, caller directory 118, and message storage device 120.

Figure 2:
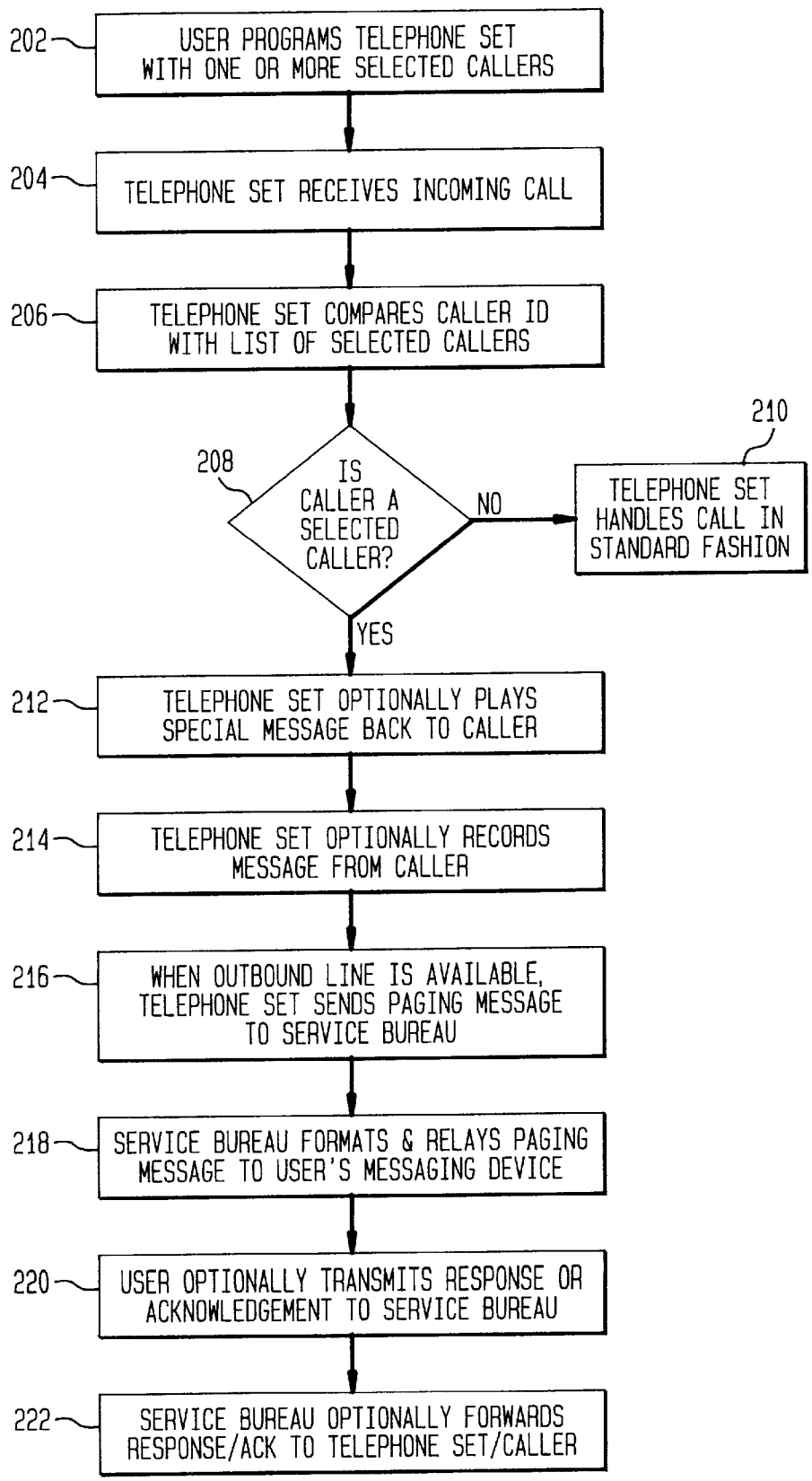
FIG. 2 is a flow diagram of the processing of the communications system of FIG. 1.

Referring now to FIG. 2, there is shown a flow diagram of the processing of the communications system of FIG. 1, according to one embodiment of the present invention. A user programs telephone set 102 with one or more selected callers (step 202 of FIG. 2). To enable this programming operation, processor 114 displays on display screen 112 a list of possible callers (previously stored in caller directory 118 by the user) from which the user may select one or more of these callers for special treatment in accordance with the present invention. The selections made by the user are part of the information stored by processor 114 in caller directory 118.

When an incoming call is received by modem 116 from caller set 104 (step 204), processor 114 compares the caller identification information (i.e., the caller ID) of the incoming call with the list of selected callers in caller directory 118 (step 206). If the current caller is not one of the selected callers (step 208), then processor 114 handles the call in a standard fashion (step 210). This may involve transmission of a prerecorded outgoing message to the caller as stored in message storage device 120 and the recording of an incoming message from the caller into message storage device 120.

If processor 114 determines that the caller is one of the selected callers (step 208), then processor 114 optionally plays a special outgoing message to the caller as stored in message storage device 120 (step 212) and optionally records an incoming message from the caller into message storage device 120 (step 214).

In addition, processor 114 causes a paging message to be transmitted via modem 116 over communications network 108 to service bureau 106 (step 216). Service bureau 106 formats the paging message as necessary and relays the formatted paging message to messaging device 110 (step 218), where messaging device 110 may be the user's pager or beeper. In one embodiment, the paging message from telephone set 102 to service bureau 106 contains just enough information to identify the selected caller. Additional information about the selected caller (e.g., carrier, personal identification number (PIN), 10-digit phone number, and all other caller ID information) is retained at service bureau 106, which uses some of that information in formatting and relaying the paging message to messaging device 110.

A typical formatted paging message could identify the name of the caller, the caller's phone number, and the time and date the call was received. Depending on the embodiment, the caller could be prompted for additional information used in generating the paging message. For example, the caller could be prompted to indicate the priority of the incoming call (e.g., urgent, normal, or low priority) and this information could be included in the paging message.

As another example, there could be different users of a single telephone set (e.g., husband and wife). A caller could be prompted to select which of the users should be the recipient of a paging message. Alternatively, each user could have his or her own personal list of potential callers. The telephone set could then automatically send paging messages to whichever users selected the particular caller.

As yet another example, the paging message could indicate whether the caller recorded a voice message or not. This would allow the user to decide whether to respond to the paging message by calling the caller back directly or listening to the recorded voice message first.

Depending on the embodiment, upon receiving the paging message, the user may have the option of responding by transmitting to service bureau 106 either a response or an acknowledgment (ACK) (step 220). In the case of a response, the user is prompted (e.g., via a display on the messaging device) to reply to a particular query, as opposed to an ACK which merely indicates that the user has received the paging message. In either case, service bureau 106 would send the response or ACK back to either telephone set 102 or caller set 104 (or both) over communications network 108 (step 222).

In one embodiment, telephone set 102 is able to queue a number of paging messages until an outbound line is available so that the paging messages can be delivered. In addition, the user is able to program the number of rings required before a paging message is sent. This number could range from immediate answer (after caller ID information is received) to any number of rings. Moreover, if a user lifts the hand set (or hits the speaker phone button) after a call has been marked for paging, the page is canceled. If a page is canceled, display screen 112 indicates that fact to the user.

In one embodiment, the hardware of telephone set 102 is based on that of conventional telephone sets. Differences lie in how processor 114 is programmed and how caller directory 118 is defined. Similarly, in one embodiment, service bureau 106 differs from conventional service bureaus in its programming.

Although, in one embodiment, communications network 108 is a conventional plain old telephone service (POTS) network and modem 116 is a network interface device appropriate for such a network, it will be understood that alternative embodiments of the present invention may utilize other communications networks and other interface devices. Similarly, although in the embodiment of FIG. 1, the paging message from telephone set 102 to service bureau 106 is transmitted over the same communications network that carries the incoming call from caller set 104 to telephone set 102, in alternative embodiments, those communications may occur over different communications networks.

In the embodiment of FIG. 1, paging messages from telephone set 102 are relayed by service bureau 106 to messaging device 110. In an alternative embodiment, telephone set 102 transmits paging messages directly to messaging device 110 (i.e., without the need for a service bureau as an intermediate relaying stage).

Those skilled in the art will understand that the present invention provides advantages over the prior art. For example, the present invention provides a mechanism for automatic user paging prompted by incoming calls from selected callers with little or no caller intervention. To send a paging message to the user, all the caller needs to do is to call the user's regular telephone number and, if that caller has been previously selected by the user, then a paging message will automatically be sent to the user by the user's telephone set. The invention therefore provides a simpler interface for the caller who wants to page the user. The caller does not have to know the specific phone number of the user's paging device. Nor does the caller have to enter manually his or her telephone number for it to be included as part of the paging message.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for processing telephone calls, comprising:
   (a) a processor; and
   (b) a network interface, wherein:
      the processor is programmed by a user with information regarding at least one selected caller;
      the network interface receives an incoming call from a caller over a communications network;
      the processor identifies the caller associated with the incoming call; and
      the processor transmits a special signal back to the communications network instructing the communications network to transmit a paging message to a pager of the user, if the caller associated with the incoming call corresponds to a selected caller.

2. The invention of claim 1, further comprising a caller directory identifying one or more selected callers, wherein the processor checks the caller directory to determine if the incoming call corresponds to the selected caller.

3. The invention of claim 1, further comprising a display screen for displaying to a user a list of possible callers for preselection as one or more selected callers.

4. The invention of claim 1, wherein the processor transmits the paging message to a service bureau, which forwards the paging message to a messaging device to notify a user of receipt of the call from the selected caller.

5. The invention of claim 4, wherein the processor transmits the paging message to the service bureau over the communications network.

6. The invention of claim 1, wherein the processor delays transmission of the paging message until an outbound line is available.

7. The invention of claim 1, wherein the paging message identifies whether the selected caller recorded an audio message.

8. The invention of claim 1, wherein the selected caller is prompted for information used in generating the paging message.

9. The invention of claim 1, further comprising:
   (c) a caller directory identifying one or more selected callers, wherein the processor checks the caller directory to determine if the incoming call corresponds to the selected caller; and
   (d) a display screen for displaying to a user a list of possible callers for preselection as the one or more selected callers, wherein:
      the processor transmits the paging message to a service bureau over the communications network, which forwards the paging message to a messaging device to notify a user of receipt of the call from the selected caller; and the processor delays transmission of the paging message until an outbound line is available.

10. A method for processing telephone calls, comprising the steps of:
   (a) programming a processor by a user with information regarding at least one selected caller;
   (b) receiving an incoming call from a caller over a communications network;
   (c) identifying by the processor the caller associated with the incoming call; and
   (d) transmitting by the processor a special signal back to the communications network instructing the communications network to transmit a paging message to a pager of the user, if the caller associated with the incoming call corresponds to a selected caller.

11. The invention of claim 10, wherein step (a) further comprises the step of checking a caller directory identifying one or more selected callers to determine if the incoming call corresponds to the selected caller.

12. The invention of claim 10, wherein step (a) further comprises the step of displaying to a user a list of possible callers for preselection as one or more selected callers.

13. The invention of claim 10, wherein the paging message is transmitted to a service bureau, which forwards the paging message to a messaging device to notify a user of receipt of the call from the selected caller.

14. The invention of claim 13, wherein the paging message is transmitted to the service bureau over the communications network.

15. The invention of claim 10, wherein transmission of the paging message is delayed until an outbound line is available.

16. The invention of claim 10, wherein the paging message identifies whether the selected caller recorded an audio message.

17. The invention of claim 10, wherein the selected caller is prompted for information used in generating the paging message.

18. The invention of claim 10, wherein step (a) further comprises the steps of:
   (1) displaying to a user a list of possible callers for preselection as one or more selected callers; and
   (2) checking a caller directory identifying one or more selected callers to determine if the incoming call corresponds to the selected caller, wherein:
      the paging message is transmitted to a service bureau over the communications network, which forwards the paging message to a messaging device to notify a user of receipt of the call from the selected caller; and
      transmission of the paging message is delayed until an outbound line is available.

19. An apparatus for processing telephone calls, comprising:
   (a) means for programming a processor by a user with information regarding at least one selected caller;
   (b) means for receiving an incoming call from a caller over a communications network;
   (c) mean for identifying the caller associated with the incoming call; and
   (d) means for transmitting a special signal back to the communications network instructing the communications network to transmit a paging message to a pager of the user, if the caller associated with the incoming call corresponds to a selected caller.

20. The invention of claim 19, wherein the paging message is transmitted to a service bureau, which forwards the paging message to a messaging device to notify a user of receipt of the call from the selected caller.

* * * * *